Aug. 28, 1928.

J. KOCSIS 1,682,574

CLUTCH LOCKING DEVICE FOR TRACTORS

Filed April 21, 1927

INVENTOR
John Kocsis
BY Zoltan Polachek
ATTORNEY

Patented Aug. 28, 1928.

1,682,574

UNITED STATES PATENT OFFICE.

JOHN KOCSIS, OF NEW YORK, N. Y.

CLUTCH-LOCKING DEVICE FOR TRACTORS.

Application filed April 21, 1927. Serial No. 185,416.

This invention relates to a new and useful device in the nature of a clutch locking lever particularly adapted for use in connection with tractors for the purpose of locking the clutch pedal in a disengaged position.

The object of the invention is to provide a clutch locking lever of novel construction and arrangement of parts, hereinafter more fully described, claimed and illustrated in the accompanying drawing.

A further object of the invention is to provide a clutch locking lever having certain adjustable features incorporated therein.

Figure 1:
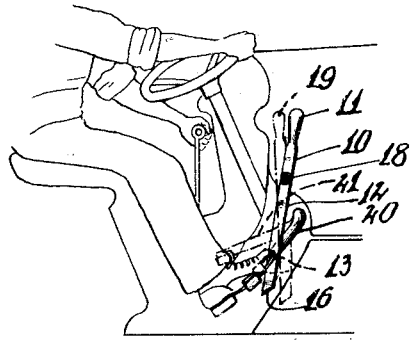
Fig. 1 is a side elevational view of a tractor provided with my improved clutch locking lever.
Figure 3:
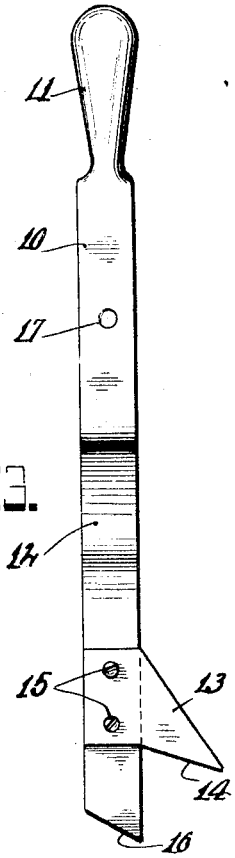
Fig. 3 is an enlarged side elevational detail view of my improved clutch lever.
Figure 2:
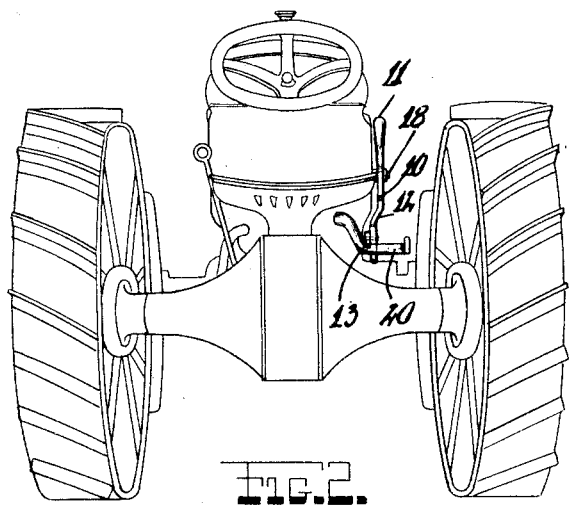
Fig. 2 is a rear elevational view thereof.

As here embodied my improved clutch locking lever embodies a lever proper 10, provided with a handle element 11. The lever proper 10, is off set intermediate thereof, as at 12. The catch member 13, is provided with a lower tapered edge 14, and is attached to the lower portion of the lever proper 10, as at 15, by threaded members, screws, bolts or the like. The catch member 13, being positioned in proximity to the lower extremity of the lever proper 10, so as to provide a notch formed by the edge 15, of the lower portion of the lever member 16, and the lower tapered edge 14, of the catch member 13. The lever proper 10, has formed therein an aperture 17, positioned intermediate thereof, adjacent to the handle element 11. The aperture 17, is adapted to receive a threaded member 18, a bolt, screw, or the like, as a means of pivotally attaching the lever member 10, to the dash board 19, or any suitable convenient component part of a tractor, as clearly shown in Fig. 1.

The above described construction and arrangement is such as will permit my improved device to hang, pivotally suspended so that the lever proper 10, will normally be in contact with the clutch pedal 20, when the said clutch pedal is in any engaged position, as designated by the reference numeral 21, clearly shown in Fig. 1. It should be understood that inertia will urge the lever member 10, downwardly or at a slightly inclined angle to the vertical position, which will permit the above mentioned notch to engage the pedal 20, when the said pedal is depressed or the clutch disengaged, so as to securely hold the said clutch in a disengaged position.

Figure 4:
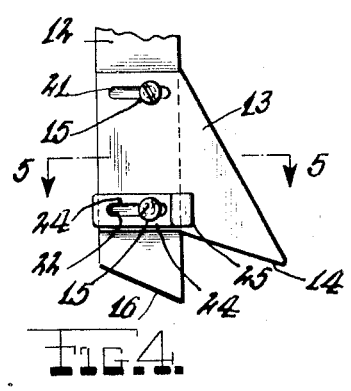
Fig. 4 is a fragmentary side elevational view, illustrating a modification of my improved device.
Figure 5:
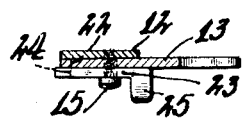
Fig. 5 is a transverse sectional view taken on the line 5—5 of Fig. 4.

In Figs. 4 and 5 of the accompanying drawing, I have shown the above mentioned catch member 13, provided with elongated transverse apertures 21 and 22, adapted to accommodate the said threaded members, 15, as a means of adjustably attaching the catch member 13, to the lower portion of the lever proper 10. I have also provided a weight member 23, having formed therein elongated transverse aperture 24, adapted to accommodate either of the threaded members 15, as a means of adjustably attaching the weight member 23, to the lever member 10, directly above and adjacent to the catch member 13. The weight member 23 is provided with an enlarged extremity 25. The above described construction being such as will permit the above mentioned notch to be increased or decreased, so as to accommodate clutch pedals of different sizes or dimensions, and which will permit the lever member 10, to swing at relatively different angles, when the clutch pedal 20, is depressed, so as to engage the said clutch pedal.

It is to be understood that my clutch lever locking device may be used to advantage especially when the tractor is operated by one man in case it is essential for him to leave the operating seat on an inclined road and in cases when the engine must be running with the gears in during repairs or when the engine of the tractor is used to run other machinery. My device may also be used to advantage when it is necessary to keep the clutch pedal down for an extended time.

While I have illustrated and described the preferred form, construction, and arrangement of the several elements employed, it will be understood that the device is nevertheless, susceptible of considerable modification therein, and I therefore reserve the privilege of resorting to all such changes as may be fairly embodied within the spirit and scope of the invention as claimed.

Having thus described my invention, what I claim as new and desire to protect by Letters Patent of the United States is as follows:

1. In a device of the class described, the combination with a lever for supporting a catch, of a catch formed with a pair of parallel elongated apertures, screws passing thru the apertures and threadedly engaged in the lever so as to hold the catch adjustably on the lever, and a weight provided with a reduced portion, having an elongated aperture, one of the said screws is passed thru the last mentioned elongated aperture to adjustably hold the weight against the catch, so that as the catch is reset, the lever may be rebalanced by adjusting the position of the weight.

2. In a device of the class described, the combination with a lever for supporting a catch, of a catch formed with parallel elongated apertures, screws passing thru the apertures and threadedly engaged in the lever so as to hold the catch adjustably on the lever, and a weight having an elongated aperture, one of the said screws is passed thru the last mentioned elongated apertures to adjustably hold the weight against the catch, so that as the catch is reset, the lever may be rebalanced by adjusting the position of the weight.

In testimony whereof I have affixed my signature.

JOHN KOCSIS.